US011198612B2

(12) United States Patent
Park et al.

(10) Patent No.: US 11,198,612 B2
(45) Date of Patent: Dec. 14, 2021

(54) GRAPHENE STRUCTURE AND METHOD FOR MANUFACTURING GRAPHENE HAVING WRINKLE PATTERN

(71) Applicant: IUCF-HYU (INDUSTRY-UNIVERSITY COOPERATION FOUNDATION HANYANG UNIVERSITY), Seoul (KR)

(72) Inventors: Wanjun Park, Seoul (KR); Sungwoo Chun, Gimpo-si (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 372 days.

(21) Appl. No.: 16/214,908

(22) Filed: Dec. 10, 2018

(65) Prior Publication Data

US 2019/0106326 A1 Apr. 11, 2019

Related U.S. Application Data

(63) Continuation of application No. PCT/KR2017/005981, filed on Jun. 9, 2017.

(30) Foreign Application Priority Data

Jun. 10, 2016 (KR) ........................ 10-2016-0072136

(51) Int. Cl.
*H01B 1/04* (2006.01)
*B32B 27/28* (2006.01)
(Continued)

(52) U.S. Cl.
CPC ............ *C01B 32/194* (2017.08); *B32B 27/28* (2013.01); *C01B 32/182* (2017.08); *H01B 1/04* (2013.01);
(Continued)

(58) Field of Classification Search
CPC ............ B32B 27/58; H01B 1/04; B82Y 30/00
(Continued)

(56) References Cited

U.S. PATENT DOCUMENTS 8,580,658 B1* 11/2013 Davis .................. H01L 29/7781
438/478
8,906,245 B2 12/2014 Ploss, Jr.
(Continued)

FOREIGN PATENT DOCUMENTS

JP 2014-034503 A 2/2014
KR 10-2011-0083546 A 7/2011
(Continued)

OTHER PUBLICATIONS

Zhu "Structure and Electronic Transport in Graphene Wrinkles." Nano Lett. 2012, 12, 3431-3436 (Year: 2012).*
(Continued)

*Primary Examiner* — Tri V Nguyen
(74) *Attorney, Agent, or Firm* — Sughrue Mion, PLLC

(57) ABSTRACT

A method for manufacturing graphene having a wrinkle pattern is provided. The method includes forming a wrinkle providing layer having a first thermal expansion coefficient on one surface of a graphene layer, forming a substrate having a second thermal expansion coefficient on one surface of the wrinkle providing layer, and performing a heat treatment to form wrinkles on the wrinkle providing layer by a difference between the first and second thermal expansion coefficients, thereby forming wrinkle patterns on the graphene layer.

5 Claims, 7 Drawing Sheets
(3 of 7 Drawing Sheet(s) Filed in Color)

(51) Int. Cl.
*B82Y 30/00* (2011.01)
*C01B 32/194* (2017.01)
*C01B 32/182* (2017.01)
*B82Y 40/00* (2011.01)

(52) U.S. Cl.
CPC ............... *B82Y 30/00* (2013.01); *B82Y 40/00* (2013.01); *C01P 2004/90* (2013.01)

(58) Field of Classification Search
USPC .......................... 252/500, 510, 511; 977/734
See application file for complete search history.

(56) References Cited

U.S. PATENT DOCUMENTS

| | | | |
|---|---|---|---|
| 8,992,807 B2 | 3/2015 | Kim et al. | |
| 9,144,962 B2 | 9/2015 | Lee et al. | |
| 2011/0171427 A1* | 7/2011 | Kim | ...................... C01B 32/182 428/152 |
| 2014/0273413 A1* | 9/2014 | Davis | .................. H01L 29/1606 438/478 |
| 2015/0273737 A1* | 10/2015 | Chen | ........................ H01B 1/04 428/336 |

FOREIGN PATENT DOCUMENTS

| | | | | | |
|---|---|---|---|---|---|
| KR | 10-2012-0029864 A | | 3/2012 | | |
| KR | 10-2013-0024360 A | | 3/2013 | | |
| KR | 1020140003354 A | * | 1/2014 | ........... | C01B 32/184 |
| KR | 10-2014-0029779 A | | 3/2014 | | |

OTHER PUBLICATIONS

Shikai Deng, et al., "Wrinkled, rippled and crumpled graphene: an overview of formation mechanism, electronic properties, and applications", Materials Today, May 2016, pp. 197-212, vol. 19, No. 4.

Seung Jin Chae, et al., "Synthesis of Large-Area Graphene Layers on Poly-Nickel Substrate by Chemical Vapor Deposition: Wrinkle Formation", Advanced Materials, 2009, pp. 2328-2333, vol. 21.

Edwin P. Chan, et al., "Viscoelastic properties of confined polymer films measured via thermal wrinkling", The Royal Society of Chemistry, Soft Matter, 2009, pp. 4638-4641.

International Search Report for PCT/KR2017/005981 dated Sep. 11, 2017 (PCT/ISA/210).

* cited by examiner

[Fig. 1]
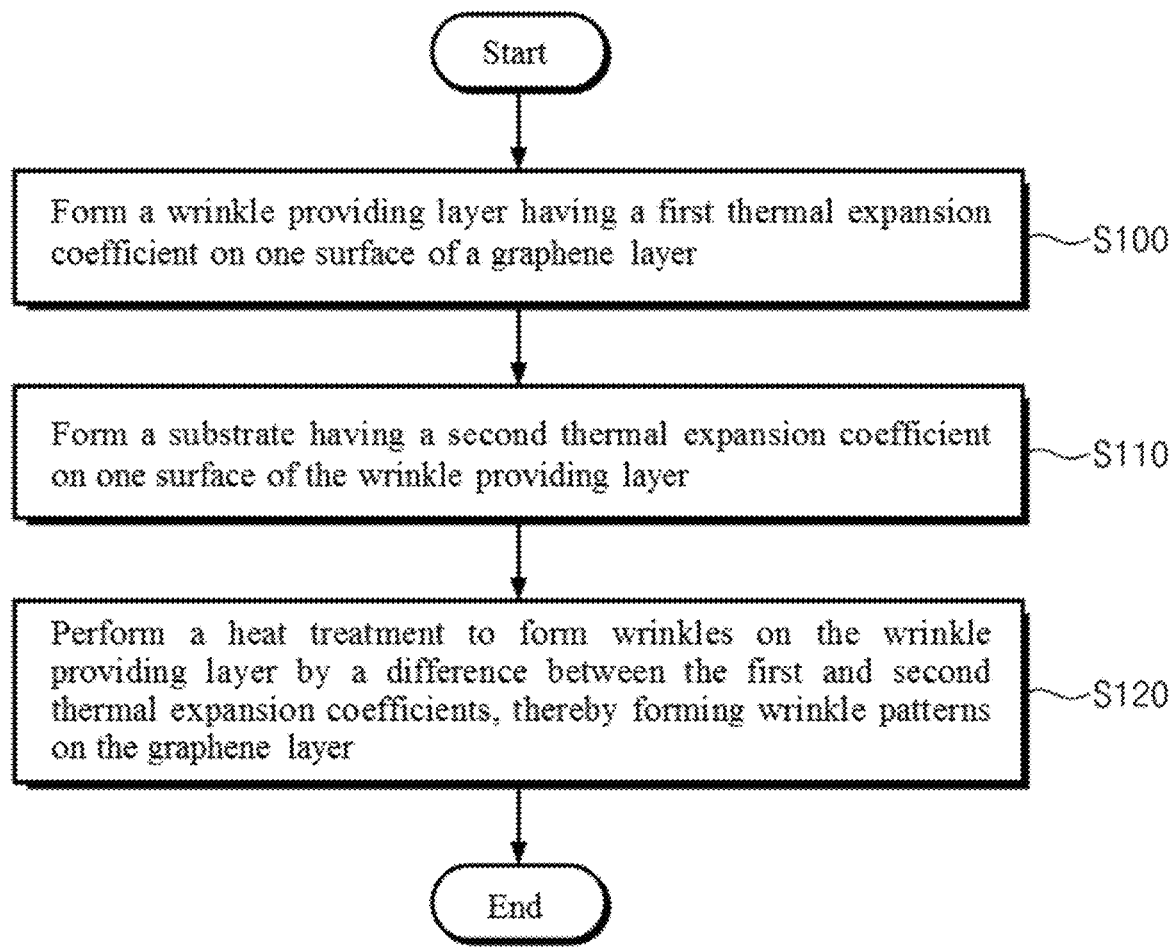

[Fig. 2]
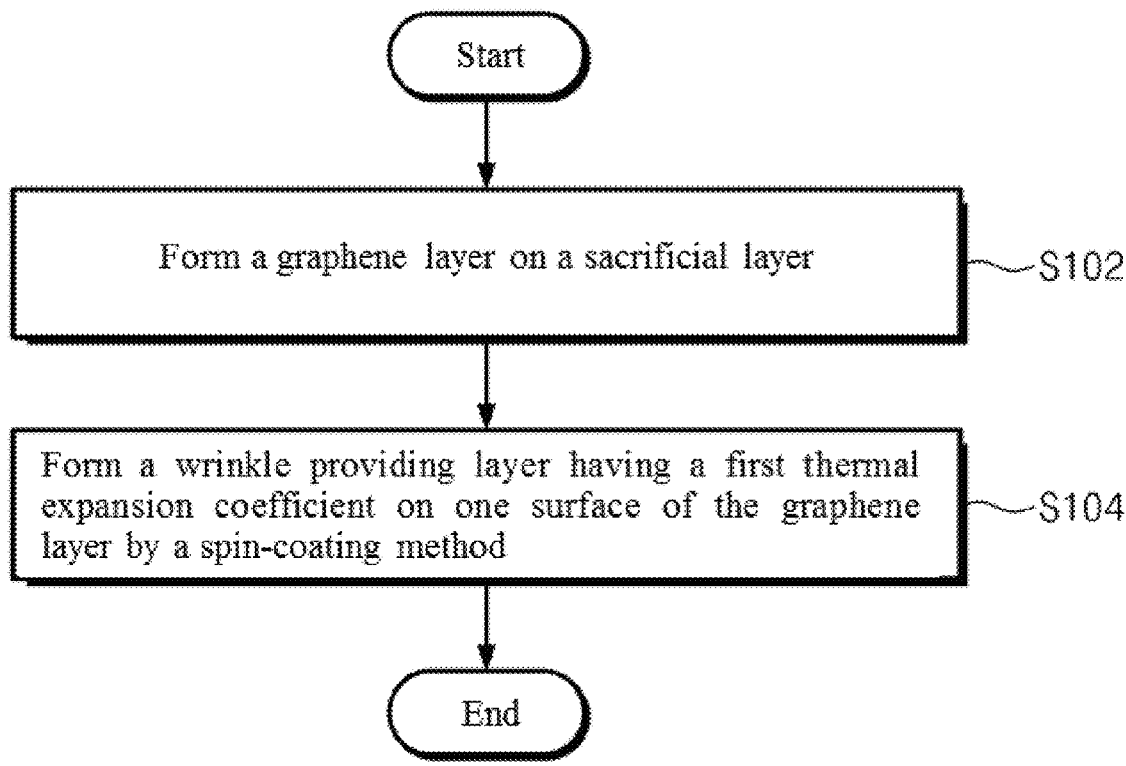

[Fig. 3]
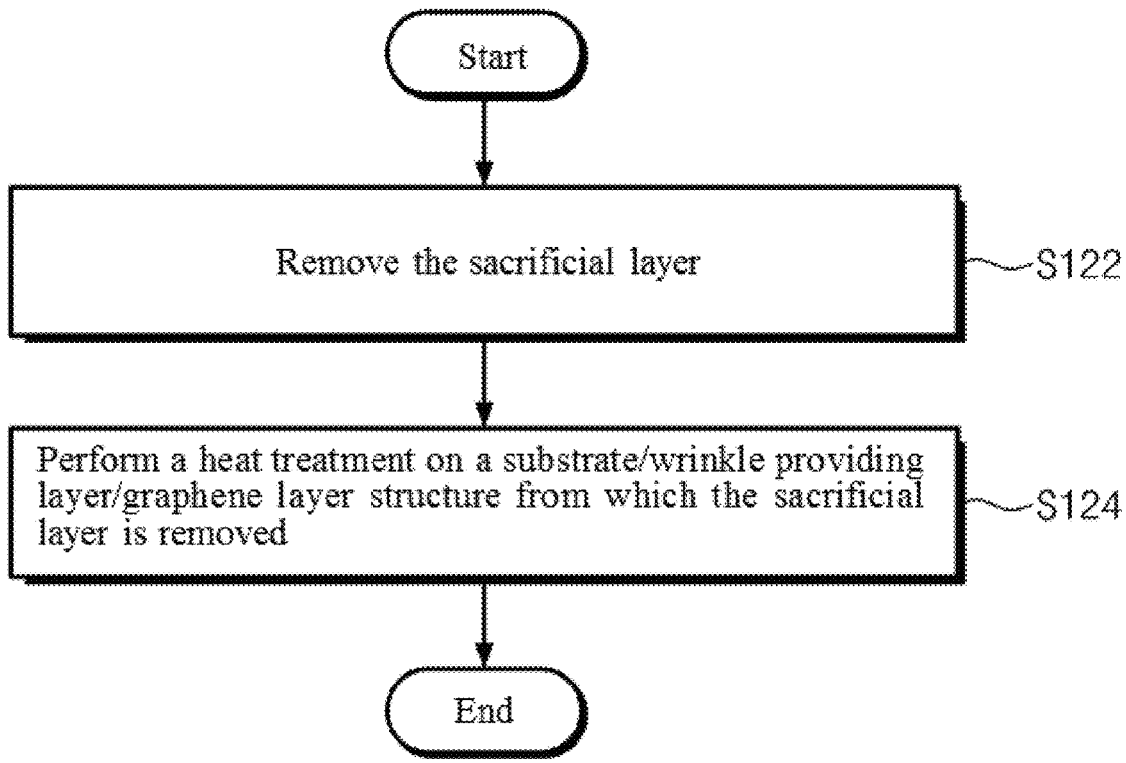

[Fig. 4]
S102
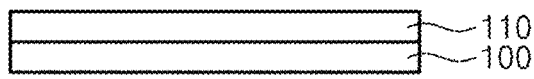
(a)
S104
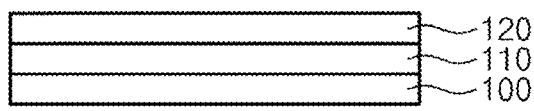
(b)
S110
(c)
S122
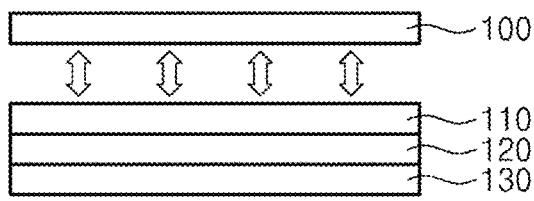
(d)
S124
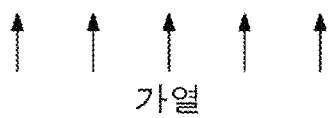
(e)

[Fig. 5]
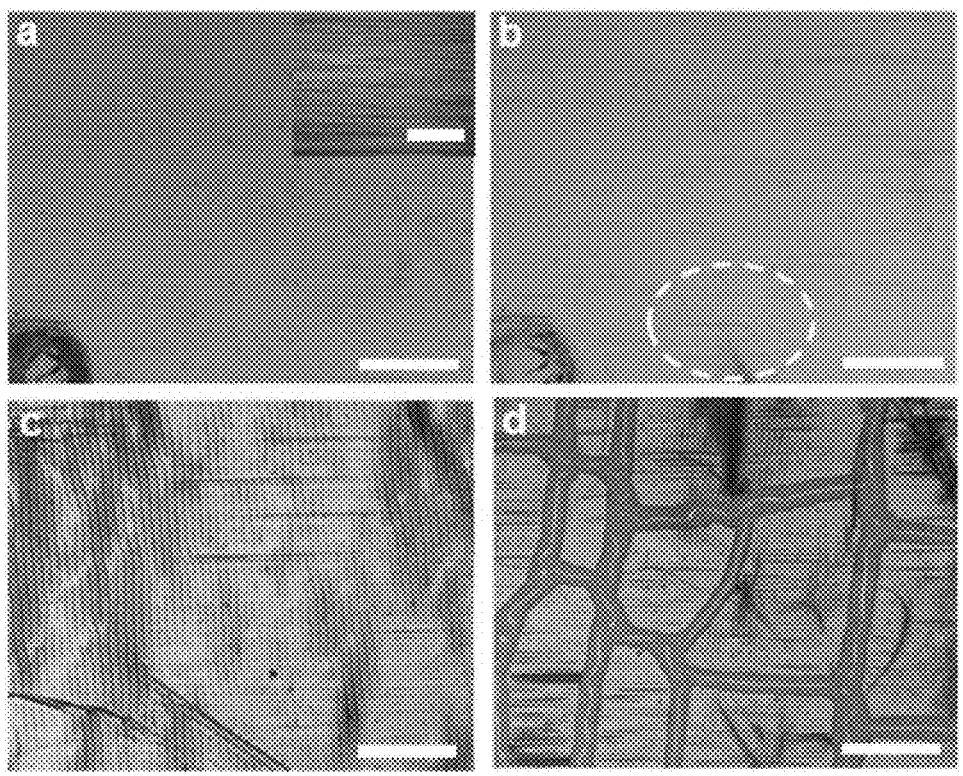

[Fig. 6]
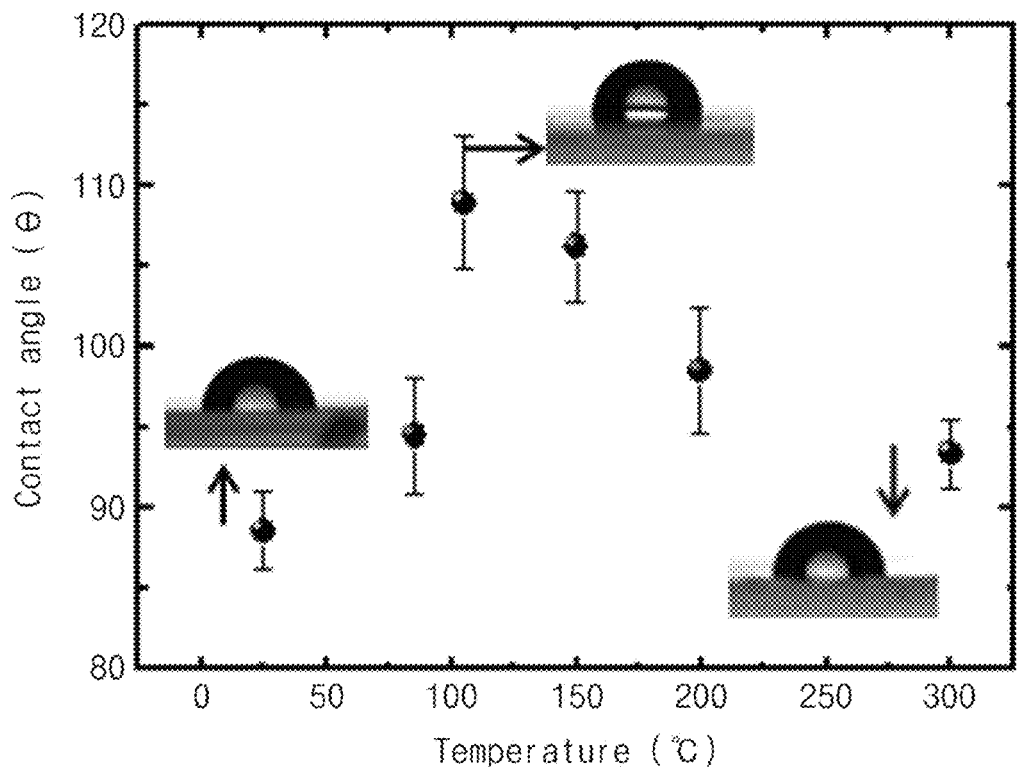
[Fig. 7]
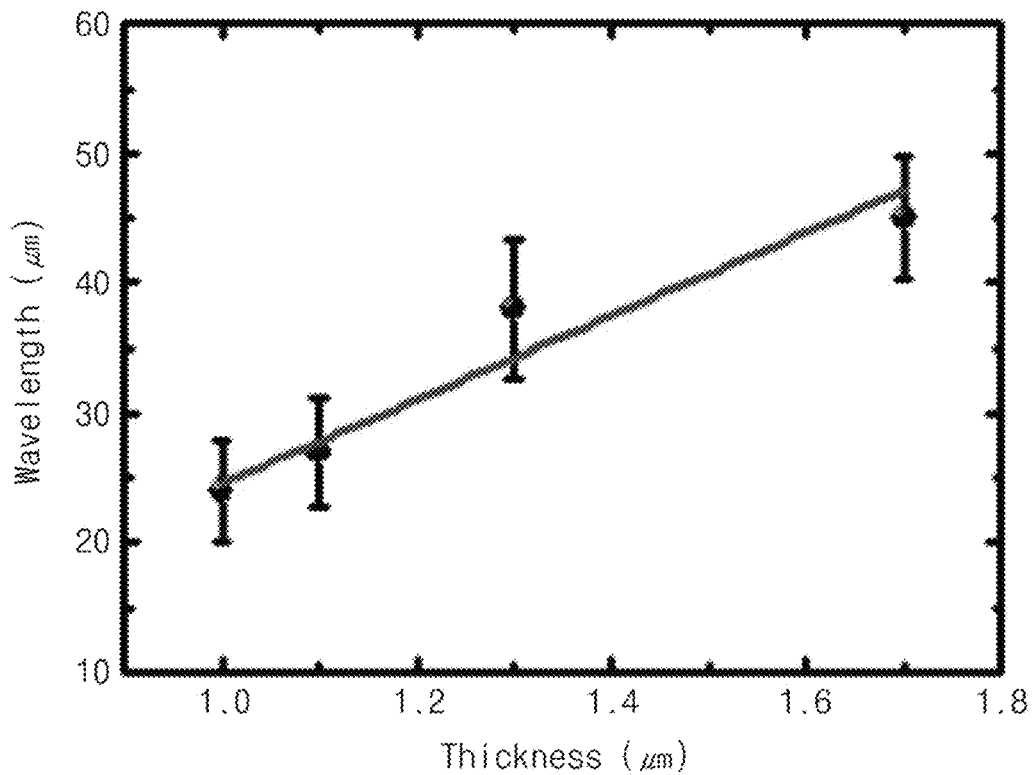

[Fig. 8]
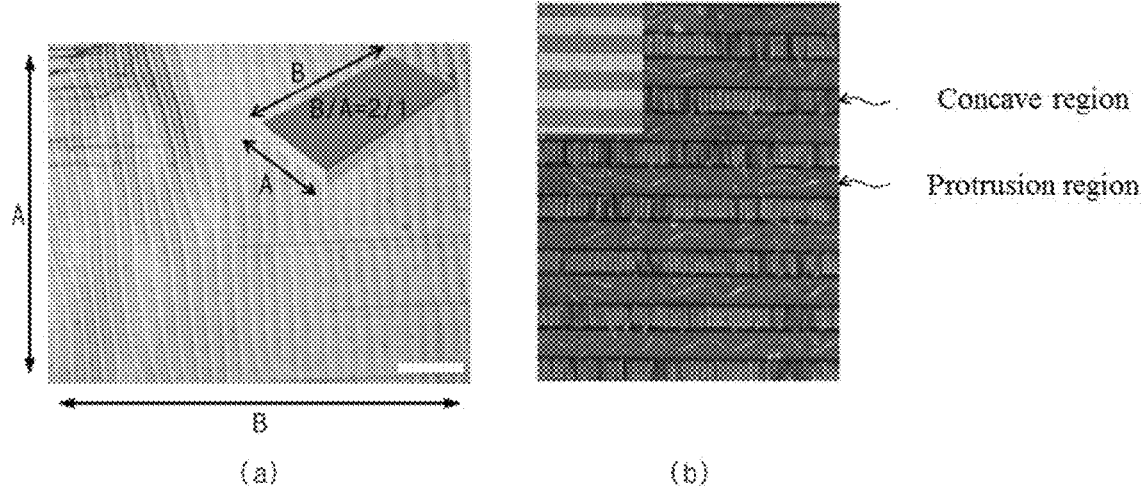

GRAPHENE STRUCTURE AND METHOD FOR MANUFACTURING GRAPHENE HAVING WRINKLE PATTERN

CROSS-REFERENCE TO RELATED APPLICATION

This application is a continuation of pending International Application No. PCT/KR2017/005981, which was filed on Jun. 9, 2017 and claims priority to Korean Patent Application No. 10-2016-0072136, filed on Jun. 10, 2016, in the Korean Intellectual Property Office, the disclosures of which are hereby incorporated by reference in their entireties.

BACKGROUND

1. Field

The present disclosure relates to a graphene structure and a method for manufacturing graphene having a wrinkle pattern, and more particularly, to a graphene structure in which a controllable wrinkle is formed on a graphene layer by providing a wrinkle providing layer between a substrate and the graphene layer, and a method for manufacturing graphene having a wrinkle pattern.

2. Description of the Related Art

Materials composed of carbon atoms may include a carbon nanotube, graphene, and graphite. The graphene is an allotrope of carbon and may have a two-dimensional plane structure composed of carbon atoms. The carbon atoms are arranged in a hexagonal lattice, and the carbon atom is located at each of vertexes of the hexagonal lattice. This shape of the graphene is called as a honeycomb structure or a honeycomb lattice. The graphene is a thin layer having a thickness corresponding to that of one atom. In other words, the graphene has a thin thickness of about 0.2 nm and has high physical and chemical stability.

The graphene has a very high intrinsic electron mobility of about 200,000 cm2/V·s, a high thermal conductivity of −5000 W/m·K, and a Young's modulus of −1.0 TPa. In addition, a theoretical specific surface area of the graphene is very great. Moreover, since the graphene is composed of a single layer, it may have a low absorption rate for visible light and thus may have a very high transmittance (e.g., 97.7%) with respect to light having a wavelength of 550 nm.

However, since the graphene is a two-dimensional material, it may be unstable. In fact, papers (e.g., intrinsic ripples in graphene, and the structure of suspended graphene sheets) have proven that graphene is unstable and uncontrolled wrinkles are formed on a surface.

Thus, the present inventors have invented a graphene structure including a controllable wrinkle formed on graphene and a method for manufacturing graphene having a wrinkle pattern.

Patent Document: Korean Patent Publication No. 10-2013-0024360

SUMMARY

The present disclosure may provide a graphene structure having a controllable wrinkle and a method for manufacturing graphene having a wrinkle pattern.

The present disclosure may also provide a graphene structure in which a highly reliable wrinkle is formed by a simple method using a heat treatment, and a method for manufacturing graphene having a wrinkle pattern.

In an aspect, a method for manufacturing graphene having a wrinkle pattern may include forming a wrinkle providing layer having a first thermal expansion coefficient on one surface of a graphene layer, forming a substrate having a second thermal expansion coefficient on one surface of the wrinkle providing layer, and performing a heat treatment to form wrinkles on the wrinkle providing layer by a difference between the first and second thermal expansion coefficients, thereby forming wrinkle patterns on the graphene layer.

In an embodiment, the first thermal expansion coefficient may be less than the second thermal expansion coefficient.

In an embodiment, a temperature of the heat treatment may be equal to or higher than a glass transition temperature of the wrinkle providing layer.

In an embodiment, a temperature of the heat treatment may be equal to or lower than a temperature at which coupling between the wrinkle patterns occurs.

In an embodiment, the substrate may be formed of a material softer than the wrinkle providing layer.

In an embodiment, a period of the wrinkle patterns may increase as a thickness of the wrinkle providing layer increases.

In an embodiment, a contact angle of the wrinkle pattern may increase as a temperature of the heat treatment approaches a glass transition temperature of the wrinkle providing layer.

In an aspect, a graphene structure may include a substrate having a first side and a second side longer than the first side, a wrinkle providing layer formed on the substrate and having wrinkles in a direction substantially parallel to the first side, and a graphene layer formed on the wrinkle providing layer and having wrinkle patterns corresponding to the wrinkles.

In an embodiment, the substrate may include protrusion and concave regions on a surface interfaced with the wrinkle providing layer, and the wrinkle patterns may be formed on the concave region.

In an embodiment, the wrinkle providing layer may have a first thermal expansion coefficient, and the substrate may have a second thermal expansion coefficient greater than the first thermal expansion coefficient.

In an embodiment, the substrate may be formed of a material softer than the wrinkle providing layer.

In an embodiment, the wrinkle providing layer may be formed of at least one of SiO$_2$, PMMA, or PVP.

In an embodiment, the substrate may be a flexible substrate.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 1 is a flowchart illustrating a method for manufacturing graphene having a wrinkle pattern, according to an embodiment of the inventive concepts.

FIG. 2 is a flowchart illustrating an operation S100 of FIG. 1 according to an embodiment of the inventive concepts.

FIG. 3 is a flowchart illustrating an operation S120 of FIG. 1 according to an embodiment of the inventive concepts.

FIG. 4 illustrates views of the method for manufacturing graphene having a wrinkle pattern, according to FIGS. 1 to 3.

FIG. 5 shows experimental results of the influence of a heat treatment temperature on formation of graphene having a wrinkle pattern, according to an embodiment of the inventive concepts.

FIG. 6 shows experimental results of the influence of a heat treatment temperature on a contact angle of a surface of graphene, according to an embodiment of the inventive concepts.

FIG. 7 shows experimental results of the influence of a thickness of a wrinkle providing layer on a shape of a wrinkle pattern of graphene, according to an embodiment of the inventive concepts.

FIG. 8 shows experimental results of the influence of a shape of a substrate on a wrinkle pattern of a surface of graphene, according to an embodiment of the inventive concepts.

DETAILED DESCRIPTION OF THE EMBODIMENTS

The inventive concepts will now be described more fully hereinafter with reference to the accompanying drawings, in which exemplary embodiments of the inventive concepts are shown. It should be noted, however, that the inventive concepts are not limited to the following exemplary embodiments, and may be implemented in various forms. Accordingly, the exemplary embodiments are provided only to disclose the inventive concepts and let those skilled in the art know the category of the inventive concepts.

It will be understood that when an element such as a layer, region or substrate is referred to as being "on" another element, it can be directly on the other element or intervening elements may be present. In addition, in the drawings, the thicknesses of layers and regions are exaggerated for clarity.

It will be also understood that although the terms first, second, third etc. may be used herein to describe various elements, these elements should not be limited by these terms. These terms are only used to distinguish one element from another element. Thus, a first element in some embodiments could be termed a second element in other embodiments without departing from the teachings of the present invention. Exemplary embodiments of aspects of the present inventive concepts explained and illustrated herein include their complementary counterparts. As used herein, the term "and/or" includes any and all combinations of one or more of the associated listed items.

The terminology used herein is for the purpose of describing particular embodiments only and is not intended to limit the invention. As used herein, the singular terms "a", "an" and "the" are intended to include the plural forms as well, unless the context clearly indicates otherwise. It will be further understood that the terms "comprises", "comprising", "includes", "including", "have", "has" and/or "having" when used herein, specify the presence of stated features, integers, steps, operations, elements, and/or components, but do not preclude the presence or addition of one or more other features, integers, steps, operations, elements, components, and/or groups thereof. Furthermore, it will be understood that when an element is referred to as being "connected" or "coupled" to another element, it may be directly connected or coupled to the other element or intervening elements may be present.

In addition, in explanation of the present invention, the descriptions to the elements and functions of related arts may be omitted if they obscure the subjects of the inventive concepts.

FIG. 1 is a flowchart illustrating a method for manufacturing graphene having a wrinkle pattern, according to an embodiment of the inventive concepts, FIG. 2 is a flowchart illustrating an operation S100 of FIG. 1 according to an embodiment of the inventive concepts, FIG. 3 is a flowchart illustrating an operation S120 of FIG. 1 according to an embodiment of the inventive concepts, and FIG. 4 illustrates views of the method for manufacturing graphene having a wrinkle pattern, according to FIGS. 1 to 3.

Referring to FIG. 1, a method for manufacturing graphene having a wrinkle pattern according to an embodiment of the inventive concepts may include at least one of an operation S100 of forming a wrinkle providing layer having a first thermal expansion coefficient on one surface of a graphene layer, an operation S110 of forming a substrate having a second thermal expansion coefficient on one surface of the wrinkle providing layer, and an operation S120 of performing a heat treatment to form wrinkles on the wrinkle providing layer by a difference between the first and second thermal expansion coefficients, thereby forming wrinkle patterns on the graphene layer. Hereinafter, each of the operations will be described in detail.

Operation S100

In the operation S100, the wrinkle providing layer having the first thermal expansion coefficient may be formed on one surface of the graphene layer. To explain the operation S100 in more detail, referring to FIG. 2, the operation S100 may include at least one of an operation S102 of forming the graphene layer on a sacrificial layer, and an operation S104 of forming the wrinkle providing layer having the first thermal expansion coefficient on one surface of the graphene layer by a spin-coating method.

In the operation S102, the graphene layer may be formed on the sacrificial layer. For example, the sacrificial layer may be formed of at least one metal of Cu, Ni, Co, Fe, Pt, Au, Al, Cr, Mg, Mn, Mo, Rh, Si, Ta, Ti, W, U, V, or Zr, or an alloy of at least two thereof. Hereinafter, the sacrificial layer formed of copper (Cu) will be described as an example. In particular, since copper has a low solubility with respect to carbon, copper may be advantageous for forming single-layered graphene.

The graphene layer may be formed on the sacrificial layer by at least one of various methods. For example, the graphene layer may be formed by a chemical vapor deposition (CVD) method such as a thermal CVD method, an inductively coupled plasma CVD (ICP-CVD) method, a plasma enhanced CVD (PE-CVD) method, or a microwave CVD method. Alternatively, the graphene layer may be formed by a rapid thermal annealing (RTA) method, an atomic layer deposition (ALD) method, or a physical vapor deposition (PVD) method.

When the graphene layer is formed on the sacrificial layer by the CVD method, the sacrificial layer may be located in a chamber, and a carbon supply source may be supplied into the chamber to grow or deposit the graphene layer. Here, the carbon supply source may include at least one of methane ($CH_4$), acetylene ($C_2H_2$), ethane, ethylene, ethanol, propane, butane, butadiene, pentane, pentene, cyclopentadiene, hexane, cyclohexane, benzene, or toluene.

For example, when a methane gas is supplied to the copper sacrificial layer in a hydrogen atmosphere in the chamber, the graphene layer may be formed on the copper sacrificial layer by reaction of hydrogen and methane.

Thus, as illustrated in a view (a) of FIG. 4, the graphene layer 110 may be formed on the sacrificial layer 100 through the operation S102. For example, the graphene layer 110 may be formed to be in direct contact with the sacrificial layer 100.

In the operation S104, the wrinkle providing layer having the first thermal expansion coefficient may be formed on the one surface of the graphene layer by the spin-coating method.

The wrinkle providing layer according to an embodiment of the inventive concepts may mean a layer which provides wrinkle patterns to the graphene layer through wrinkles formed on the layer itself. The wrinkle providing layer may be selected in consideration of various factors to form wrinkles on the wrinkle providing layer itself.

A thermal expansion coefficient may be considered as the factor. For example, the wrinkle providing layer may have a different thermal expansion coefficient from that of the substrate to be described later in more detail. In an embodiment, the thermal expansion coefficient of the wrinkle providing layer may be less than the thermal expansion coefficient of the substrate. Thus, when the heat treatment is performed on the substrate and the wrinkle providing layer, the wrinkles may be formed on the wrinkle providing layer by the different thermal expansion coefficients from each other.

In addition, the wrinkle providing layer may be formed of a material harder than the substrate. Thus, when the heat treatment is performed on the substrate and the wrinkle providing layer, the wrinkles may be formed on the wrinkle providing layer by expansion of the substrate.

In some embodiments, adhesion energy showing adhesive strength between the wrinkle providing layer and the graphene layer may be considered. For example, when the adhesion energy is low, the wrinkles formed on the wrinkle providing layer may not be transferred to the graphene layer, and delamination may occur between the wrinkle providing layer and the graphene layer.

In some embodiments, the wrinkle providing layer may be selected in consideration of a surface roughness.

In some embodiments, the wrinkle providing layer may be selected in consideration of a glass transition temperature.

For example, the wrinkle providing layer may be formed of at least one of $SiO_2$, poly methyl methacrylate (PMMA), or poly vinyl pyrrolidone (PVP). Hereinafter, the wrinkle providing layer formed of PMMA will be described as an example.

In some embodiments, wrinkles (or wrinkle patterns) of the graphene layer may be controlled by a thickness of the wrinkle providing layer. For example, a period of the wrinkles of the graphene layer may increase as the thickness of the wrinkle providing layer increases.

The wrinkle providing layer may be formed on one surface of a structure of the copper sacrificial layer and the graphene layer, formed in the operation S102. For example, the wrinkle providing layer may be formed on the one surface of the graphene layer. At this time, the wrinkle providing layer may be formed on the one surface of the graphene layer by the spin-coating method.

Thus, the sacrificial layer 100, the graphene layer 110 and the wrinkle providing layer 120 may be sequentially stacked through the operation S104 as illustrated in a view (b) of FIG. 4.

Operation S110

Referring again to FIG. 1, in the operation S110, the substrate having the second thermal expansion coefficient may be formed on one surface of the wrinkle providing layer. In other words, the graphene layer formed on the wrinkle providing layer may be transferred onto the substrate. Thus, the one surface of the wrinkle providing layer may be in direct contact with the substrate.

The substrate may be selected depending on the factor considered in relation with the wrinkle providing layer, described above. In other words, the thermal expansion coefficient of the substrate may be different from the thermal expansion coefficient of the wrinkle providing layer. In detail, the thermal expansion coefficient of the substrate may be greater than the thermal expansion coefficient of the wrinkle providing layer. Thus, as described above, the wrinkles may be formed on the wrinkle providing layer by using the phenomenon that degrees of expansion of the substrate and the wrinkle providing layer in the heat treatment are different from each other by the difference in thermal expansion coefficient therebetween, and formation of wrinkle patterns of the graphene layer may be induced by the wrinkles of the wrinkle providing layer.

In addition, the substrate may be formed of a material softer than the wrinkle providing layer.

At this time, the substrate may be a flexible substrate.

Based on at least one of the aforementioned features of the substrate, the substrate may be formed of at least one of polydimethylsiloxane (PDMS), polyethylene terephthalate (PET), polyethersulfone (PES), polyimide (PI), or polyethylene naphthalate (PEN). Hereinafter, the substrate formed of PDMS will be described as an example.

In addition, lengths of a first side and a second side of the substrate may be different from each other. For example, a length of a transverse side of the substrate may be different from a length of a longitudinal side of the substrate. In some embodiments, the transverse side of the substrate may be longer than the longitudinal side of the substrate.

A direction of the wrinkles of the graphene layer may be determined by a length difference of the sides of the substrate. When the transverse side of the substrate is longer than the longitudinal side of the substrate, wrinkles in a direction parallel to the longitudinal side may be formed on the graphene layer. Alternatively, the longitudinal side of the substrate may be longer than the transverse side of the substrate. In this case, wrinkles in a direction parallel to the transverse side may be formed on the graphene layer. In other words, the direction of the wrinkles of the graphene layer may be controlled through the difference between the transverse length and the longitudinal length of the substrate. It may be understood that the parallel direction used herein includes a substantially parallel direction.

In addition, the substrate may further include a pattern including a protrusion region and a concave region which are repeated on its surface being in contact with the wrinkle providing layer.

Since the substrate has the pattern at the contact interface with the wrinkle providing layer, a region of the graphene layer in which the wrinkles are formed may be controlled. When the substrate has the pattern of the protrusion region and the concave region on the surface of the substrate, main wrinkles of the wrinkle providing layer may be intensively formed on the concave region. Thus, the wrinkle patterns of the graphene layer may be intensively formed on the concave region. In other words, the region of the graphene layer in which the wrinkle patterns are formed may be controlled by the pattern of the surface of the substrate.

As illustrated in a view (c) of FIG. 4, the sacrificial layer 100, the graphene layer 110, the wrinkle providing layer 120 and the substrate 130 may be sequentially stacked through the operation S110. In other words, the copper layer 100, the graphene layer 110, the PMMA layer 120 and the PDMS layer 130 may be sequentially stacked.

Operation S120

In the operation S120, the heat treatment may be performed to form the wrinkles on the wrinkle providing layer by the difference between the first and second thermal expansion coefficients, thereby forming the wrinkle patterns on the graphene layer. In more detail, referring to FIG. 3, the operation S120 may include at least one of an operation S122 of removing the sacrificial layer, and an operation S124 of performing a heat treatment on a substrate/wrinkle providing layer/graphene layer structure from which the sacrificial layer is removed. Hereinafter, each of the operations will be described in detail.

In the operation S122, the sacrificial layer may be removed.

The sacrificial layer 100 (see a view (d) of FIG. 4) may be removed by, for example, a wet method using a $FeCl_3$ solution and HCl. Thereafter, a remaining structure may be rinsed using HCl and deionized (DI) water.

In the operation S124, the heat treatment may be performed (see a view (e) of FIG. 4).

In other words, the heat treatment may be performed to form the wrinkles on the wrinkle providing layer by the difference between the first thermal expansion coefficient of the wrinkle providing layer and the second thermal expansion coefficient of the substrate, and thus the wrinkle patterns may be formed on the graphene layer.

That is, a difference in thermal expansion between the substrate and the wrinkle providing layer may be induced by applying heat to a triple layer of the graphene layer, the wrinkle providing layer and the substrate sequentially stacked. For example, when the thermal expansion coefficient of the substrate is greater than the thermal expansion coefficient of the wrinkle providing layer, the substrate may be expanded more than the wrinkle providing layer. Thus, the wrinkles may be formed on the wrinkle providing layer. At this time, since the graphene layer is disposed on the wrinkle providing layer, the wrinkle patterns corresponding to a morphology of the wrinkles formed on the wrinkle providing layer may be formed on the graphene layer.

At this time, a temperature of the heat treatment may be equal to or higher than a glass transition temperature of the wrinkle providing layer. If the temperature of the heat treatment is lower than the glass transition temperature, the formation of the wrinkles may not be actively performed, and thus the wrinkles may be formed in a local region. Thus, uniformity of the wrinkles may be deteriorated.

In addition, the temperature of the heat treatment may be equal to or lower than a temperature at which coupling between the wrinkle patterns occurs. If the temperature of the heat treatment is higher than the temperature at which the coupling between the wrinkle patterns occurs, the uniformity of the wrinkles may be deteriorated by the coupling between the wrinkle patterns.

Thus, the temperature of the heat treatment may be equal to or higher than the glass transition temperature of the wrinkle providing layer and may be equal to or lower than the temperature at which the coupling between the wrinkle patterns occurs.

In some embodiments, the wrinkle direction of the graphene layer may be controlled by the shape of the substrate. As described above, when the transverse side of the substrate is longer than the longitudinal side of the substrate, the wrinkles in the direction parallel to the longitudinal side of the substrate may be formed on the graphene layer. Alternatively, when the longitudinal side of the substrate is longer than the transverse side of the substrate, the wrinkles in the direction parallel to the transverse side of the substrate may be formed on the graphene layer.

In addition, according to some embodiments, the region of the graphene layer in which the wrinkle patterns are formed may be controlled by the pattern of the surface of the substrate. As described above, when the pattern of the protrusion region and the concave region is formed on the surface of the substrate, the main wrinkles of the wrinkle providing layer may be intensively formed on the concave region. Thus, the wrinkle patterns of the graphene layer may be intensively formed on the concave region.

The graphene structure and the method for manufacturing the graphene having the wrinkle pattern according to the embodiments of the inventive concepts were described above with reference to FIGS. 1 to 4. According to the embodiments of the inventive concepts, the wrinkle providing layer may be provided between the substrate and the graphene layer, and the substrate and the wrinkle providing layer may have the different thermal expansion coefficients from each other. Thus, the wrinkle patterns may be formed on the graphene layer.

In a conventional art, unintended non-uniform wrinkles may occur on a graphene layer by limitations of a two-dimensional structure of the graphene layer. In other words, since uncontrollable wrinkles are formed on a graphene layer in a conventional art, it is difficult to form a highly reliable graphene layer.

However, according to the embodiments of the inventive concepts, the wrinkle providing layer may be formed between the graphene layer and the substrate, and the wrinkles may be formed at the wrinkle providing layer and the graphene layer through the heat treatment. Here, the period of the wrinkle patterns of the graphene layer may be controlled by the thickness of the wrinkle providing layer, and the degree of the wrinkle of the graphene layer may be controlled by the temperature of the heat treatment. In addition, the region of the wrinkle patterns of the graphene layer may be controlled by the shape of the pattern of the substrate. Thus, the controllable wrinkles may be formed on the graphene layer in the graphene structure and the method for manufacturing the graphene having the wrinkle pattern according to the embodiments of the inventive concepts. As a result, the graphene with high reliability may be provided or realized.

Hereinafter, experimental results according to some embodiments of the inventive concepts will be described with reference to FIGS. 5 to 8. A graphene structure to be described with reference to FIGS. 5 to 8 may have a structure in which the wrinkle providing layer formed of PMMA is disposed on the substrate formed of PDMS and the graphene layer is disposed on the wrinkle providing layer.

FIG. 5 shows experimental results of the influence of a heat treatment temperature on formation of graphene having a wrinkle pattern, according to an embodiment of the inventive concepts.

An image (a) of FIG. 5 shows a surface of a graphene layer before performing a heat treatment. As shown in the image (a) of FIG. 5, contraction does not occur at the surface of the graphene layer, and thus wrinkles are not formed.

An image (b) of FIG. 5 shows a surface of the graphene layer when the heat treatment is performed at 85 degrees Celsius. As shown in the image (b) of FIG. 5, wrinkles are locally formed. This may mean that the wrinkles are not actively formed since the temperature of the heat treatment does not reach the glass transition temperature of the wrinkle providing layer.

An image (c) of FIG. 5 shows a surface of the graphene layer when the heat treatment is performed at 105 degrees Celsius. As shown in the image (c) of FIG. 5, high-density wrinkle patterns are formed on the surface of the graphene layer. This may be because the wrinkles are actively formed by the heat treatment performed at the glass transition temperature of the wrinkle providing layer.

An image (d) of FIG. 5 shows a surface of the graphene layer when the heat treatment is performed at 150 degrees Celsius. As shown in the image (d) of FIG. 5, wrinkles having great volumes are locally formed on the surface of the graphene layer. This may mean that wrinkles are coupled to each other by an excessive heat treatment to locally form the wrinkles having the great volumes.

As a result of analyzing the influence of the temperature of the heat treatment on the formation of the wrinkle patterns of the graphene described with reference to FIG. 5, it is preferable that the temperature of the heat treatment is equal to or higher than the glass transition temperature and is equal to or lower than the temperature at which the coupling between the wrinkle patterns occurs. In other words, the degree of the wrinkle patterns of the surface of the graphene layer may be controlled by controlling the temperature of the heat treatment in the range.

FIG. 6 shows experimental results of the influence of a heat treatment temperature on a contact angle of a surface of graphene, according to an embodiment of the inventive concepts.

Referring to FIG. 6, a contact angle of the wrinkle pattern of the graphene layer is reduced before and after the glass transition temperature. That is, when the temperature of the heat treatment is lower or higher than 105 degrees Celsius, the contact angle of the wrinkle pattern of the graphene layer is reduced. In other words, as the temperature of the heat treatment approaches the glass transition temperature, the contact angle of the wrinkle pattern of the graphene layer may increase to improve a non-hydrophilic property of the graphene layer. As a result, the contact angle of the wrinkle pattern of the surface of the graphene layer may be controlled by controlling the temperature of the heat treatment.

FIG. 7 shows experimental results of the influence of a thickness of a wrinkle providing layer on a shape of a wrinkle pattern of graphene, according to an embodiment of the inventive concepts.

As shown in FIG. 7, the period of the wrinkle patterns formed on the graphene layer increases as the thickness of the wrinkle providing layer increases. In other words, the period of the wrinkle patterns of the graphene layer may be controlled by controlling the thickness of the wrinkle providing layer.

FIG. 8 shows experimental results of the influence of a shape of a substrate on a wrinkle pattern of a surface of graphene, according to an embodiment of the inventive concepts.

A view (a) of FIG. 8 shows wrinkle patterns of a graphene layer on a flat substrate having a longitudinal side 'A' and a transverse side 'B' longer than the longitudinal side 'A'. As shown in the view (a) of FIG. 8, the wrinkle pattern of the graphene layer extends in a direction substantially parallel to a short side 'A' of the substrate.

A view (b) of FIG. 8 shows wrinkle patterns of the graphene layer on the substrate having protrusion regions and concave regions which are alternately and repeatedly arranged. As shown in the view (b) of FIG. 8, the wrinkle patterns of the graphene layer are intensively formed on the concave regions of the substrate.

In other words, a position of the wrinkle pattern formed on the graphene layer may be controlled depending on the formation of the pattern of the substrate.

According to the graphene structure and the method for manufacturing the graphene having the wrinkle pattern described above with reference to FIGS. 1 to 8, the period of the wrinkle patterns of the graphene layer, the contact angle of each of the wrinkle patterns of the graphene layer, the formation degree of the wrinkle patterns of the graphene layer, and the formation position of the wrinkle pattern of the graphene layer may be controlled based on the simple method corresponding to the heat treatment. Thus, unintended wrinkles may be formed in a conventional art, but the wrinkle patterns of the graphene layer may be controlled according to the embodiments of the inventive concepts. As a result, the graphene with the high reliability may be provided according to the embodiments of the inventive concepts.

The graphene structure according to the embodiments of the inventive concepts may be used in at least a supercapacitor, a strain sensor, a non-hydrophilic property requiring field, and a purifier.

According to the embodiments of the inventive concepts, the method for manufacturing graphene having a wrinkle pattern may include forming the wrinkle providing layer having the first thermal expansion coefficient on one surface of the graphene layer, forming the substrate having the second thermal expansion coefficient on one surface of the wrinkle providing layer, and performing the heat treatment to form the wrinkles on the wrinkle providing layer by a difference between the first and second thermal expansion coefficients, thereby forming the wrinkle patterns on the graphene layer.

Thus, controllable wrinkle patterns may be formed on the graphene layer by the wrinkles formed on the wrinkle providing layer. In addition, since the wrinkle patterns are formed on the graphene layer through the difference in thermal expansion coefficient between the wrinkle providing layer and the substrate, the wrinkle patterns may be formed on the graphene layer by a simpler method.

In other words, the embodiments of the inventive concepts may provide the graphene structure and the method for manufacturing the graphene having the wrinkle pattern, which are capable of forming the controllable wrinkles by the simpler method.

While the inventive concepts have been described with reference to exemplary embodiments, it will be apparent to those skilled in the art that various changes and modifications may be made without departing from the spirits and scopes of the inventive concepts. Therefore, it should be understood that the above embodiments are not limiting, but illustrative. Thus, the scopes of the inventive concepts are to be determined by the broadest permissible interpretation of the following claims and their equivalents, and shall not be restricted or limited by the foregoing description.

What is claimed is:

1. A graphene structure comprising:
   a substrate having a first side and a second side longer than the first side;
   a wrinkle providing layer formed on the substrate and having wrinkles in a direction parallel to the first side; and
   a graphene layer formed on the wrinkle providing layer and having wrinkle patterns in a direction parallel to the first side so as to correspond to the wrinkles, wherein the substrate includes protrusion regions in contact with the wrinkle providing layer and concave regions non-contacting with the wrinkle providing layer on a surface interfaced with the wrinkle providing layer, and the wrinkle patterns are formed on the concave regions.

2. The graphene structure of claim 1, wherein the wrinkle providing layer has a first thermal expansion coefficient, and the substrate has a second thermal expansion coefficient greater than the first thermal expansion coefficient.

3. The graphene structure of claim 1, wherein the substrate is formed of a material softer than the wrinkle providing layer.

4. The graphene structure of claim 1, wherein the wrinkle providing layer is formed of at least one of $SiO_2$, PMMA, or PVP.

5. The graphene structure of claim 1, wherein the substrate is a flexible substrate.

* * * * *